United States Patent [19]

Suzuki

[11] Patent Number: 5,535,418
[45] Date of Patent: Jul. 9, 1996

[54] INFORMATION PROCESSING SYSTEM WITH SELECTION OF INPUT/OUTPUT PROCESSING CONTROL ACCORDING TO PRECALCULATED INPUT/OUTPUT PROCESSING TIME

[75] Inventor: Shigeo Suzuki, Kawasaki, Japan

[73] Assignee: Canon Kabushiki Kaisha, Tokyo, Japan

[21] Appl. No.: 517,654

[22] Filed: Aug. 22, 1995

Related U.S. Application Data

[63] Continuation of Ser. No. 83,272, Jun. 29, 1993, abandoned.

[30] Foreign Application Priority Data

Jun. 30, 1992 [JP] Japan .................................. 4-196159

[51] Int. Cl.$^6$ .................................................. G06F 15/16
[52] U.S. Cl. .................................. 395/845; 364/DIG. 1; 364/DIG. 2; 364/238.2; 364/241.1; 364/241.2; 364/940; 364/940.1; 395/867; 395/868
[58] Field of Search ........................ 364/DIG. 1 MS File, 364/DIG. 2 MS File; 395/375, 500, 650, 800, 821, 825, 826, 840, 845, 878, 867, 868

[56] References Cited

FOREIGN PATENT DOCUMENTS

| 0473279 | 3/1992 | European Pat. Off. . |
| 63-159960 | 7/1988 | Japan . |

OTHER PUBLICATIONS

"Mode Setting In A Peripheral System" by M. P. Kapaln et al., IBM Technical Disclosure Bulletin, vol. 25, No. 10 Mar. 1983; p. 5012.

"Advanced 16/32/BIT Mircrocontrollers" by P. N. Heath; 8080 Wescon 88/Conference Record 32 (1988) Nov., North Hollywood, CA, USA pp. 1–6.

Rodnay Zaks, "Programming the Z80" (1982) ISBN:0–89588–069–5 pp. 492–496.

Primary Examiner—Robert B. Harrell
Attorney, Agent, or Firm—Fitzpatrick, Cella, Harper & Scinto

[57] ABSTRACT

An information processing system, which can realize an I/O process with high processing efficiency regardless of the time required for the I/O process, is provided. For this purpose, a time required for an I/O process is calculated prior to the I/O process, and an optimal control system is selected from a plurality of selectable I/O control systems in accordance with the calculated time, thereby controlling the I/O process.

6 Claims, 3 Drawing Sheets

INFORMATION PROCESSING SYSTEM WITH SELECTION OF INPUT/OUTPUT PROCESSING CONTROL ACCORDING TO PRECALCULATED INPUT/OUTPUT PROCESSING TIME

This application is a continuation of application No. 08/083,272 filed Jun. 29, 1993, now abandoned.

BACKGROUND OF THE INVENTION

1. Field of the Invention

The present invention relates to an information processing system comprising a computer system having a CPU for performing a normal arithmetic process and a memory, and an input/output (I/O) device having a function of performing an I/O process in response to an I/O request received from the computer system, and informing end of the I/O process to the computer system.

2. Related Background Art

Conventionally, in a system of this type, an I/O device receives an I/O request from a program operating on a computer system. When an I/O process ends, the I/O device issues an interruption signal to the computer system or changes the value of a register, which can be read out by the computer system, thereby informing the end of the I/O process to the computer system. Therefore, the program operating on the computer system issues an I/O request after the entry of a program to be executed after the end of an I/O process is registered in advance in a corresponding interruption vector, or senses a register in the I/O device to wait for the end of the I/O process after it issues an I/O request, and thereafter, starts a program to be executed after the end of the I/O process. In this case, the former I/O processing system is called an interruption system, and the latter I/O processing system is called a polling system.

However, in the prior art, control of the I/O device must be programmed by permanently selecting one of the interruption system and the polling system. When the interruption system is selected, a CPU can execute another job until the end of I/O. However, when an interruption process is started, the CPU status (register contents) must be saved and returned. For this reason, when the I/O processing time (from an I/O request to I/O end) executed by the I/O device is short, the processing efficiency is undesirably lowered.

On the other hand, when the polling system is selected, if the I/O processing time is short, the processing efficiency is better than that of the interruption system since the polling system requires neither of the CPU status save and return processes. However, if the I/O processing time is long, since the CPU must keep polling during this time, the throughput of the entire system is lowered. That is, when an I/O device such as a hard disk device for which the processing time changes depending on, e.g., the current head position to be controlled, an optimal process cannot always be performed even if such control is programmed using either system.

SUMMARY OF THE INVENTION

It is an object of the present invention to provide an information processing system which can realize an I/O process with high processing efficiency by dynamically switching an I/O process control method in accordance with the time required for the I/O process.

According to one aspect, the present invention which achieves these objectives relates to an information processing system including a computer system and an input/output device, the input/output device comprising: a reception unit for receiving an input/output request from the computer system, a processing unit for processing the input/output request received by the reception means, a calculation unit for calculating a processing time required for the received input/output request by the processing means prior to the input/output process, and an information unit for informing the processing time calculated by the calculation means to the computer system; and the computer system comprising: an issue unit for issuing an input/output request to the input/output device, a selection unit for selecting an input/output processing control system on the basis of the processing time informed from the input/output device, and a control unit for controlling an input/output process on the basis of the control system selected by the selection unit.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DESCRIPTION OF THE PREFERRED EMBODIMENTS

The preferred embodiment of the present invention will be described hereinafter with reference to the accompanying drawings.

Figure 1:
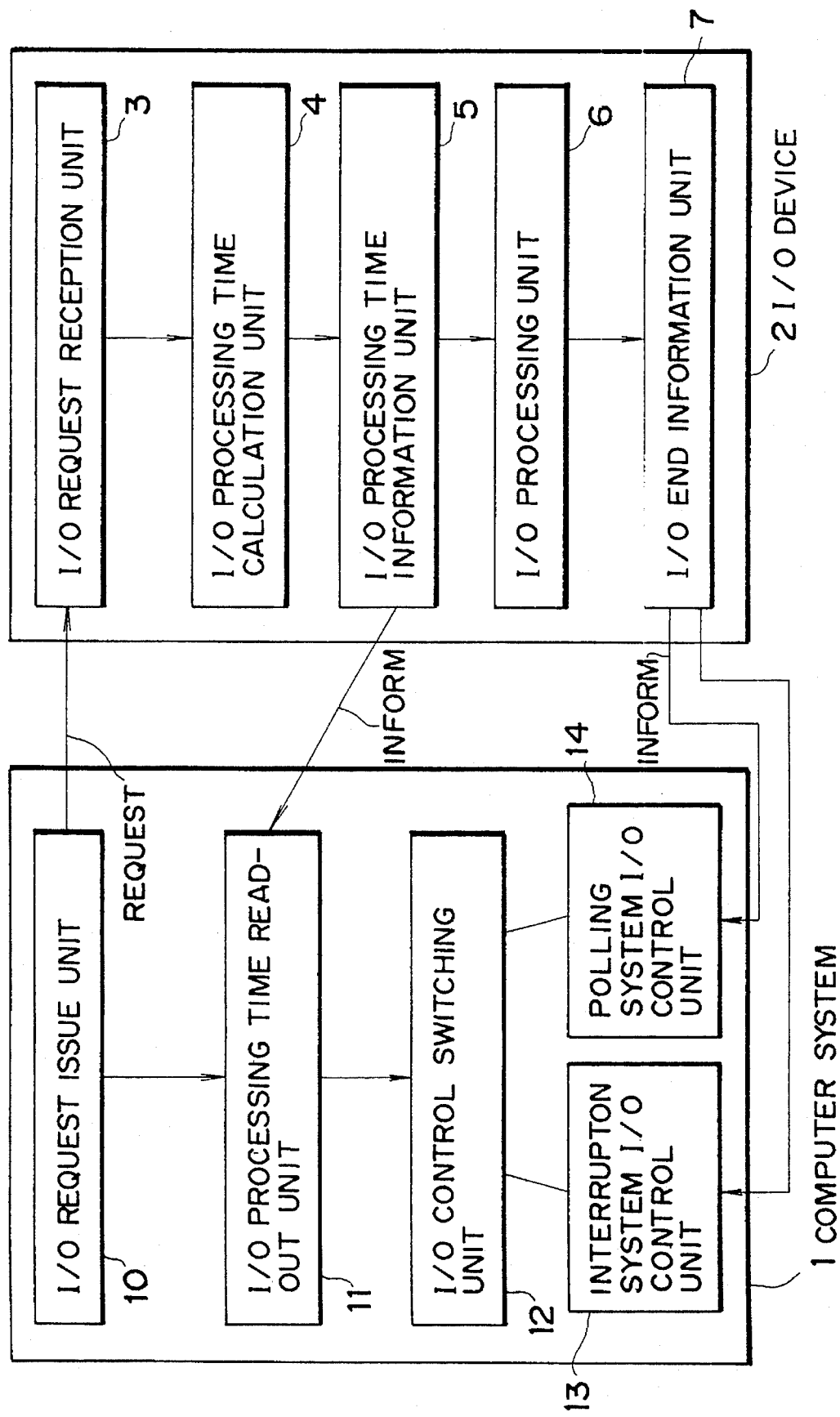
FIG. 1 is a block diagram showing a block arrangement of an information processing system according to an embodiment of the present invention.

FIG. 1 is a block diagram showing a block arrangement of an information processing system according to an embodiment of the present invention.

In FIG. 1, the information processing system is constituted by a computer system 1 including a memory and a CPU, and an I/O device 2 including an I/O request reception unit 3 for receiving an I/O request issued by the computer system 1, an I/O processing time calculation unit 4 for calculating an expected I/O processing time, an I/O processing time information unit 5 for informing the calculated I/O processing time to the computer system 1, an I/O processing unit 6 for executing an actual I/O process, an I/O end information unit 7 for forming the end of an I/O process to the computer system 1, and the like. Note that a plurality of I/O devices 2 may be provided to the computer system 1.

The computer system 1 includes an I/O request issue unit 10 for issuing an I/O request to the I/O device 2, an I/O processing time read out unit 11 for reading out the processing time value informed by the I/O processing time information unit 5, an I/O control switching unit 12 for dynamically switching an I/O control system in accordance with the value read out by the I/O processing time read out unit 11, an interruption system I/O control unit 13 realized in a switchable format, and a polling system I/O control unit 14 realized in a switchable format.

Figure 3:
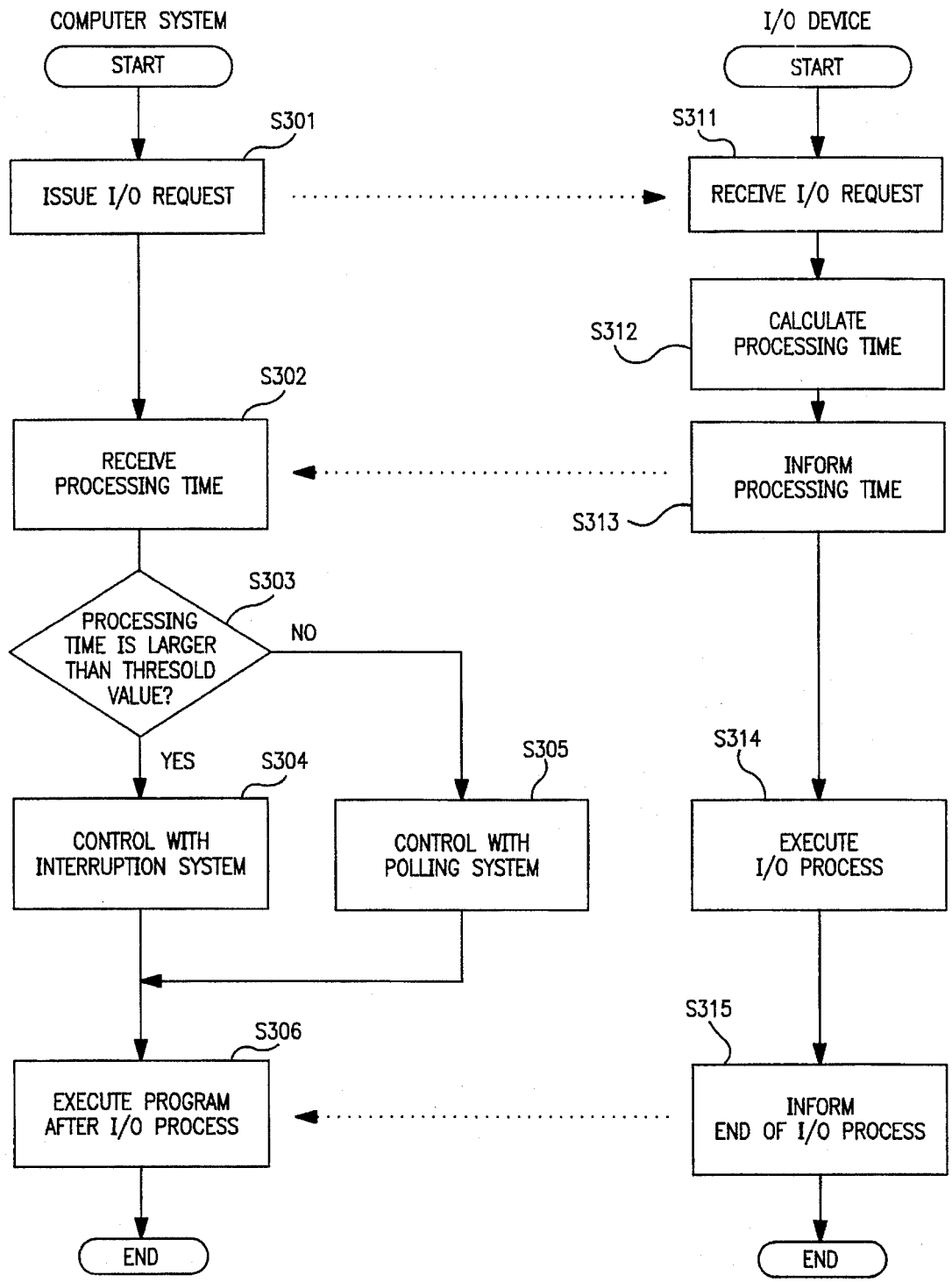
FIG. 3 is a flow chart for the I/O process.

The operations of the respective units will be described below with reference to the flow chart of FIG. 3.

When the computer system 1 controls the I/O device 2, the I/O request issue unit 10 issues an I/O request to the I/O device 2 (step 301). In general, the I/O request is issued in such a manner that a register (for receiving an I/O request) for the I/O device 2 is mapped on a memory space or an I/O space of the computer system 1, and the I/O request issue unit 10 writes information necessary for issuing the I/O request in the mapped space.

In the I/O device 2, the I/O request reception unit 3 receives the I/O request issued by the I/O request issue unit 10, and interprets the content of the request (step S311). The I/O processing time calculation unit 4 calculates an expected processing time required for the requested I/O process (step S312), and the I/O processing time information unit 5 informs the calculated I/O processing time to the computer system 1 (step S313). In the case of, e.g., a hard disk device, the I/O processing time is calculated on the basis of the distance from the current head position to a track position corresponding to the I/O request, the size of data to be transferred, the time required for a read or write access to the hard disk, and the like.

Informing to the computer system 1 is performed in such a manner that a register (for informing an I/O processing time) for the I/O device 2 is mapped on the memory space or the I/O space of the computer system 1, and the computer system 1 reads out the mapped area.

Upon completion of the informing of the I/O processing time, the I/O device 2 causes the I/O processing unit 6 to execute an actual I/O process (step S314). In parallel with to this process, the computer system 1 causes the I/O processing time read out unit 11 to read out the I/O processing time (step S302), and determines based on the readout value whether the I/O control switching unit 12 selects the interruption system I/O control unit 13 or the polling system I/O control unit 14 (step S303). In this determination, a threshold value is set in advance, and when the I/O processing time exceeds the threshold value, the interruption system I/O control unit 13 is selected; otherwise, the polling system I/O control unit 14 is selected.

As the threshold value, the time required for save and return processes of the CPU status may be used. Because, if the interruption system is executed when the I/O processing time is shorter than the time required for save and return processes of the CPU status, the throughput may be lowered as compared to the polling system, as shown in FIG. 2.

In the information processing system with the above-mentioned arrangement, when an I/O request is issued from the computer system 1, and is received by the I/O device, the I/O processing time calculation unit 4 calculates an I/O processing time expected for the received I/O request. When the calculated I/O processing time is informed to the computer system by the I/O processing time information unit 5, the I/O control switching unit 12 switches an I/O control system for the I/O device 2 to one of the interruption system and the polling system on the basis of the informed I/O processing time, thereby improving the throughput of the entire information processing system.

Figure 2:
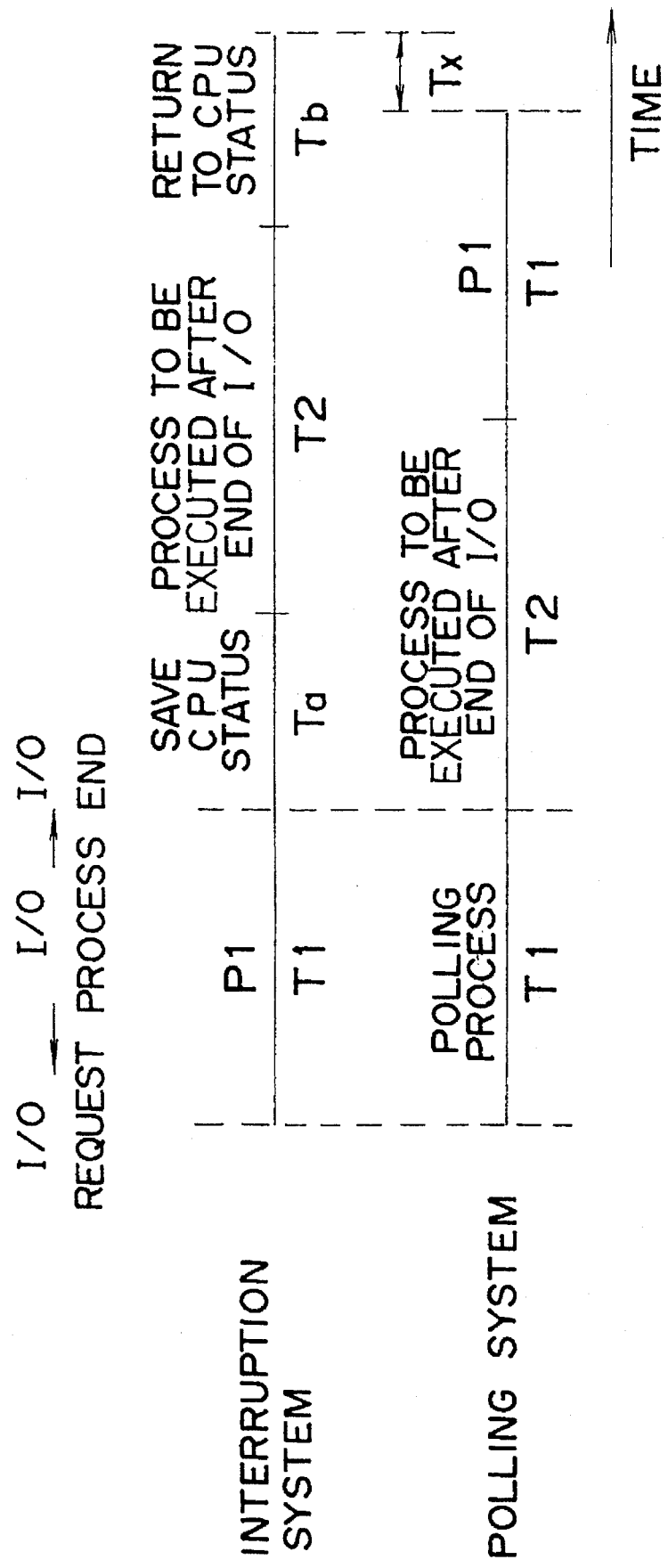
FIG. 2 is a chart showing the throughput of an I/O process.

FIG. 2 is a chart showing the throughput of an I/O process in the information processing system shown in FIG. 1.

In FIG. 2, T1 represents the I/O processing time, Ta represents the CPU status save processing time, Tb represents the return processing time, and T2 represents the processing time to be executed after the end of I/O.

Assuming that the above-mentioned times satisfy T1<Ta+Tb, if the interruption system is selected, the CPU executes another executable processing (process P1 in FIG. 2) for the I/O processing time T1, and the total time including the processing time of the process P1 is T1+Ta+T2+Tb.

On the other hand, if the polling system is selected, a polling process is executed for the I/O processing time T1, and thereafter, the process to be executed after the end of I/O is executed for the time T2. Thereafter, if a process P1 is executed for the purpose of comparison with the interruption system, the total time is T1+T2+T1. Therefore, the processing time difference between the polling and interruption systems corresponds to a difference between (Ta+Tb) and T1. When T1<Ta+Tb, the total processing execution time of the polling system is shorter by Tx=(Ta+Tb)−T1 than the interruption system. Therefore, in the case of a system placing importance on the throughput, the threshold value is set to be Ta+Tb.

However, a system placing importance on turn around is not always limited to this value. In this case, when the time Tx assumes a small value, the interruption system should often be selected rather than the polling system. In such a case, the threshold value is smaller than Ta+Tb. In this manner, the threshold value may be arbitrarily determined by a system designer in accordance with requirements for a system to be realized.

When the I/O control switching unit 12 selects the interruption system I/O control unit 13, the entry of a program to be executed after the end of the I/O process is registered in a corresponding interruption vector (step S304). This registration may be statically made in advance as long as the entry of the program is not dynamically changed. The computer system 1 then executes another executable process.

When the polling system I/O control unit 14 is selected, the register (for informing end of the I/O process) for the I/O device 2 mapped on the memory or I/O space of the computer system 1 is sensed to wait for the end of the I/O processing (step S305). During the polling process, interruption is masked to hold interruption from the I/O device 2.

On the other hand, when the I/O process ends, the I/O device 2, which has been executing the actual I/O process using the I/O processing unit 6, causes the I/O end information unit 7 to inform the end of the I/O process to the computer system 1. This information is made either by interrupting the computer system 1 or by changing the value of the register for informing the end of the I/O process in correspondence with the interruption system I/O control unit 13 or the polling system I/O control unit 14.

In the computer system 1, when the interruption system I/O control unit 13 is selected, the end of the I/O processing is informed by interruption (step S315). When an interruption signal is generated, the control enters a program registered in the corresponding interruption vector, and the program to be executed after the end of the I/O process is executed (step S306).

When the polling system I/O control unit 14 is selected, the end of the I/O process is informed by changing the value of the register for informing the end of the I/O process (step S315). When the computer system 1, which has been executing the polling process, reads a change in register value, it ends the polling process, and executes a program to be executed after the end of the I/O process (step S306).

As described above, according to this embodiment, when an I/O request is issued from the computer system, and is received by the I/O device, an expected I/O processing time required for the received I/O request is calculated. When the calculated I/O processing time is informed to the computer system, the I/O control system for the I/O device is switched to the interruption system or the polling system on the basis of the informed I/O processing time. Therefore, the I/O processing efficiency of the entire system can be remarkably improved as compared to a system in which the I/O control system is limited to either the interruption system or the polling system.

Although the present invention has been described in its preferred form with a certain degree of particularity, many apparently widely different embodiments of the invention can be made without departing from the spirit and scope thereof. It is to be understood that the invention is not limited to the specific embodiments thereof except as defined in the appended claims.

What is claimed is:

1. An information processing system comprising:

a computer system (1) and an input/output device (2), said input/output device (2) comprising:

reception means (3) for receiving an input/output request from said computer system (1), processing means (6) for processing the input/output request received by said reception means (3), estimation means (4) for calculating a processing time estimated to be required for processing the received input/output request by said processing means (6) in advance of actually processing the received input/output request, first information means (5) for informing the processing time calculated by said estimation means (4) to said computer system (1), and second information means (7) for informing an end of the processing of the received input/output request by said processing means (6) to said computer system (1); and said computer system (1) comprising:

issue means (10) for issuing the input/output request to said input/output device (2), first control means (13) for controlling said computer system (1) in accordance with an interruption system during the processing of the input/output request and when the end of the processing is informed from said second information means (7), second control means (14) for controlling said computer system (1) in accordance with a polling system during the processing of the input/output request and when the end of the processing is informed from said second information means (7), and selection means (12) for selecting one of said first control means (13) or said second control means (14) for controlling said computer system (1), in accordance with the processing time informed from said input/output device (2).

2. A system according to claim 1, wherein when the processing time is shorter than a predetermined time, said selection means (12) selects said second control means (14) and when the processing time is equal to or longer than the predetermined time, said selection means (12) selects said first control means (13).

3. A system according to claim 2, wherein the predetermined time is a time required for saving and returning a CPU status.

4. A method for processing an input/output request in an information processing system comprising a computer system and an input/output device, said method comprising the steps of:

issuing an input/output request from said computer system to said input/output device;

estimating a processing time estimated to be required for processing the input/output request issued from said information processing system, in advance of actually processing the input/output request, by said input/output device;

informing said computer system of a calculated processing time by said input/output device;

selecting one of an interruption system or a polling system as a control system for controlling processing of the input/output request according to the informed processing time by said computer system;

processing the input/output request by said input/output device;

controlling said computer system during the processing of the input/output request in accordance with the selected control system;

informing an end of the processing to said computer system by said input/output device; and controlling said computer system in accordance with the selected control system when the end of the processing is informed.

5. A method according to claim 4, wherein when the processing time is shorter than a predetermined time, said computer system selects the polling system as the control system, and when the processing time is equal to or longer than the predetermined time, said computer system selects the interruption system as the control system.

6. A method according to claim 5, wherein the predetermined time is a time required for saving and returning a CPU status.

* * * * *